(12) United States Patent
Mildh et al.

(10) Patent No.: US 7,142,860 B2
(45) Date of Patent: Nov. 28, 2006

(54) NETWORK/CELL/INTERFACE SELECTION IN MIXED NETWORKS

(75) Inventors: Gunnar Mildh, Danderyd (SE); David Sugirtharaj, Blackrock (IE); Peter Edlund, Tumba (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 603 days.

(21) Appl. No.: 10/096,692

(22) Filed: Mar. 12, 2002

(65) Prior Publication Data

US 2002/0193139 A1 Dec. 19, 2002

Related U.S. Application Data

(60) Provisional application No. 60/280,305, filed on Mar. 30, 2001.

(51) Int. Cl.
*H04Q 7/20* (2006.01)
*H04Q 7/00* (2006.01)
*H04M 1/00* (2006.01)

(52) U.S. Cl. ............ 455/443; 455/432.1; 455/552.1; 370/331

(58) Field of Classification Search ............ 455/552.1, 455/553.1, 444, 442, 433, 432.1, 439, 445, 455/432.3; 370/352, 395.1, 332, 331, 338
See application file for complete search history.

(56) References Cited

U.S. PATENT DOCUMENTS

| | | | |
|---|---|---|---|
| 6,148,197 A | | 11/2000 | Bridges et al. ............ 455/432 |
| 6,167,283 A | * | 12/2000 | Korpela et al. ............ 455/525 |
| 6,198,937 B1 | * | 3/2001 | DeClerck et al. ............ 455/517 |
| 6,510,146 B1 | * | 1/2003 | Korpela et al. ............ 370/332 |
| 6,546,251 B1 | * | 4/2003 | Dalsgaard et al. ............ 455/437 |
| 6,594,242 B1 | * | 7/2003 | Kransmo ............ 370/331 |
| 6,795,437 B1 | * | 9/2004 | Rasanen et al. ............ 370/395.1 |
| 6,819,659 B1 | * | 11/2004 | Palat et al. ............ 370/331 |
| 2003/0168725 A1 | * | 9/2003 | Warner et al. ............ 257/686 |

FOREIGN PATENT DOCUMENTS

| | | |
|---|---|---|
| EP | 1 069 793 | 1/2001 |
| EP | 1 130 799 | 9/2001 |
| WO | WO 96/38997 | 12/1996 |
| WO | WO 00/42808 | 7/2000 |
| WO | WO 01/58190 | 8/2001 |

OTHER PUBLICATIONS

ISR; PCT/SE 02/00637; Date Mailed Sep. 27, 2002.

* cited by examiner

*Primary Examiner*—Tilahun Gesesse
(74) *Attorney, Agent, or Firm*—Roger S. Burleigh

(57) ABSTRACT

A method is disclosed for selecting mode of operation for a mobile station in a mixed telecommunication system comprising first and second core networks, wherein the mobile station is adapted for selective operation in either of first and second modes associated with the first and second core networks, respectively. When the mobile station enters a combined cell, it is furnished with specified information for use in selecting mode of operation, the specified information usefully being combined with information relating to history of the mobile station prior to entering the combined cell. The specified information may be parameters introduced in the cell broadcast system information, parameters which are introduced in the mobile station SIM information, or may be explicit signaling messages specifically directed to the mobile station. Specific information also may be a combination of parameters from each of these sources.

22 Claims, 1 Drawing Sheet

GERAN Cell INFO (3 bit), Iu Mode of operation control Information.

000 Non-Iu capable cell
001 The Mobile shall select Iu mode
011 The Mobile shall keep current Interface mode
100 The mobile shall select A/Gb mode of operation
101 The mobile may select Iu or A/Gb mode of operation
110 Thr Mobile shall keep current Interface mode in packet transfer mode

NETWORK/CELL/INTERFACE SELECTION IN MIXED NETWORKS

CROSS REFERENCE TO RELATED APPLICATION

This Application for Patent claims the benefit of priority from, and hereby incorporates by reference the entire disclosure of, co-pending U.S. Provisional Application for Patent No. 60/280,305, filed Mar. 30, 2001.

BACKGROUND OF THE INVENTION

The invention disclosed and claimed herein generally pertains to a mixed system for mobile telecommunications, wherein a mobile station (MS) can operate and be connected with any one of two or more core networks included in the system. More particularly, the invention pertains to a method or procedure for determining which of the core networks a mobile station should camp on, that is, which mode the mobile station should select to operate in.

In certain mobile telecommunications networks, operators are starting to deploy 3G networks, in order to deliver new and innovative services to end-users. A 3G network could either be supplanted in existing 2G cells such as GSM/EDGE Radio Access Network (GERAN) or be deployed separately such as for UMTS Terrestrial Radio Network (UTRAN). The 2G networks will remain in place for legacy terminals so that both 2G and 3G will co-exist for many years to come. One aspect of this coexistence is seamlessness. The end-user while using multi-mode phones expects to be able to roam and stay connected while moving between these two networks.

Current 2G and 3G mobile networks are each separated into a radio access network (RAN) and a core network (CN). The RAN deals with radio resource handling while the CN provides other services such as mobility management, IP address allocation and call control facilities to the user equipment (UE). Core network services are provided in both the packet-switched and circuit-switched domains.

The control of which cell a mobile station (MS) should communicate with is controlled by the RAN and the MS. The RAN controls the cell selection in connected mode on dedicated channels and by admission control, while the MS controls the cell selection in idle mode and on shared channels in connected modes. As is known, an MS is in idle mode when it is roaming and switched on, in a non-active mode. The MS behavior in the MS controlled cases is standardized, and the algorithms and criteria for the Public Land Mobile Network (PLMN) and for cell selections are in accordance with the GSM and UTRAN standards.

However, with the introduction of cells such as GERAN that support both the 2G and 3G core networks, as well as mixed networks supporting different radio access technologies (RAT), an enhanced cell selection needs to be made available. The problem is that with the introduction of cells such as GERAN, a single GSM cell will now support both the 3G (Iu) and 2G (A/Gb) core network access. At the same time, there is currently no efficient way for the operator in a mixed system to control which of these core networks the MS should camp on, that is, which mode the MS should operate in. Potentially, this may cause the MS to bounce between two CN access nodes when moving between cells supporting 2G only and cells supporting both 2G and 3G core networks. This would lead to extensive location updating signaling in the mixed network. The RAN would have to transparently transport these messages, and the core network would actually have to process them. The information regarding the UE in the core network (PDP context) would actually bounce between the 2G and 3G Serving GPRS nodes. This is generally unacceptable behavior. Presently, no solutions for interface selection have been presented in any standard.

Herein, the terms "mixed system" and "mixed network" are used to refer to a telecommunications system having two or more core networks such as 2G and 3G.

SUMMARY OF THE INVENTION

The invention is generally directed to a method for providing parameters or information to a mobile station entering a combined or mixed network cell, that is, a cell in which the mobile station can select different modes of operation, each corresponding to one of a plurality of different core networks. The parameters indicate which mode of operation the MS should select and which core network node it should interface with. The parameters can, for example, be furnished to the MS by broadcasting system information (SI) or packet system information (PSI) in the cell; by introducing the parameters in the subscriber identification module (SIM) of the MS, or by sending explicit signaling messages to the MS. A hybrid approach could also be used, wherein some or all of the above techniques are combined, such as to control the MS interface selection on both a per call basis and a per subscription basis and with explicit signaling. In addition, MS mode selection could be made to depend on the history of the MS such as current mobility management (MM), radio resource/radio resource control (RR/RRC) state, RAT or other information that is kept in the MS such as the number of cell changes per unit time. It is anticipated that other approaches for providing mode selection parameters to the MS, which are well within the scope of the invention, will occur to those of skill in the art.

In one embodiment, directed to a mixed system comprising first and second core networks, wherein a mobile station is adapted for operation in first and second modes associated with the first and second networks, respectively, a method is provided for selecting a mode of operation for the mobile station when it enters a combined cell. The method comprises the steps of furnishing the mobile station with parameter information pertaining to mode of operation, and combining the parameter information with information pertaining to prior history of the mobile station, in order to select the mode of operation for the particular mobile station when it enters the combined cell.

In another embodiment, pertaining in particular to 2G and 3G core networks, added functions are introduced when performing the interface selection algorithms in 2G/3G cells and hence 2G and 3G core networks. This would be network level hysterisis control, in addition to the cell level hysterisis control which is currently being performed. No changes to existing cell selection and reselection algorithms or criteria are necessary. This solution deals with a CN selection once a cell is chosen, for cells that support multiple core networks. This approach is novel in the sense that it introduces a service based CN selection without affecting the radio environment, e.g., to offer 3G services to end users based on user identity, mobile capability and location in mixed networks, which is generally not possible with prior systems.

It is anticipated that embodiments of the invention will substantially reduce signaling load in both RAN and CN, provide improved network control as to where the mobile camps and registers, and improve UE behavior at 2G/3G network borders. Embodiments may also provide shorter user data paths from service gateways and perform load sharing between 2G CN and 3G network nodes. As a further benefit, different paging strategies may be applied, according to whether the mobile station is in Iu mode of operation or in A/Gb mode of operation. It will be readily understood that Iu and A/Gb modes of operation pertain to operation in connection with 3G and 2G core networks, respectively.

DETAILED DESCRIPTION OF PREFERRED EMBODIMENTS

Figures 1, 2:
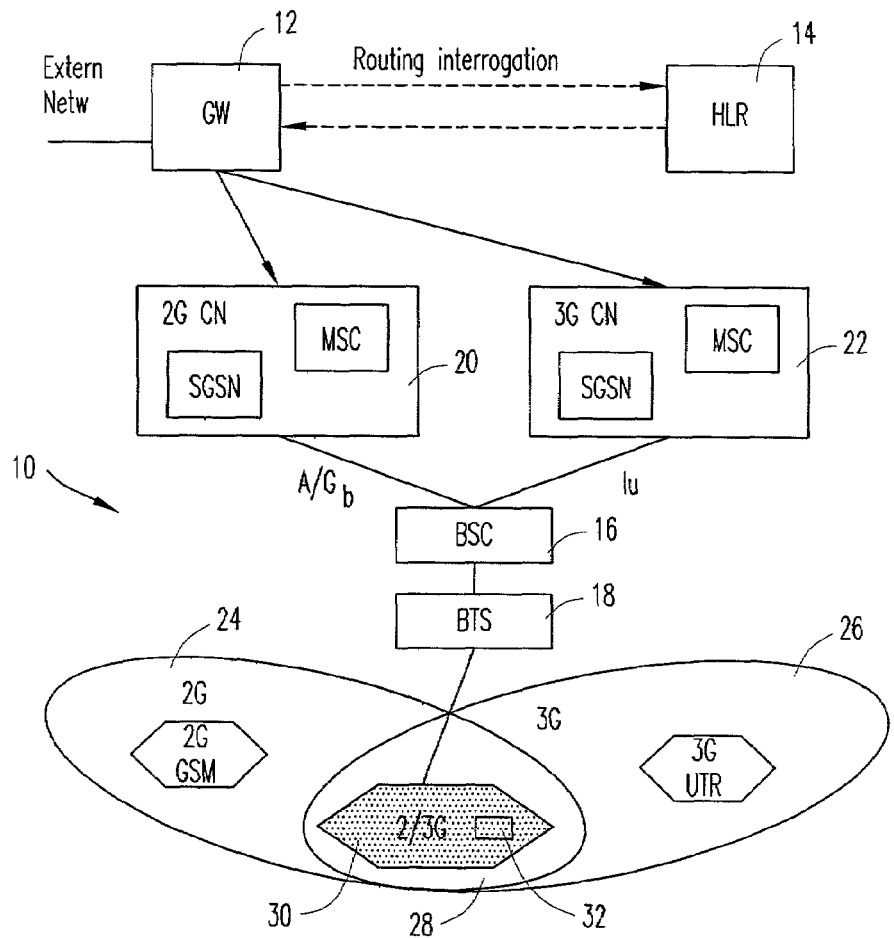
FIG. 1 is a schematic diagram showing a mixed network or system adapted for use with embodiments of the invention.
FIG. 2 is a chart showing Iu mode of operation control information.

Referring to FIG. 1, there is shown a combined or mixed telecommunications network 10 comprising a gateway (GW) 12, a home location register (HLR) 14, a base station controller (BSC) 16 and a base transceiver station (BTS) 18. FIG. 1 further shows GW 12 connected to an external network such as service gateway and coupled to BSC 16 through two different core networks, 2G core network 20 and 3G core network 22, associated with GERAN and UTRAN, respectively. Thus, BSC 16 serves a 2G location area (LA) 24 and a 3G LA 26, which share an overlapping or common area 28 containing a combined 2/3G cell 30. The MSC and SGSN blocks shown in FIG. 1 represent Mobile Switching Centers and Serving GPRS Support Nodes, respectively.

Referring further to FIG. 1, there is shown a mobile station 32 in combined cell 30 which can operate in both 2G and 3G modes. Accordingly, a user data path can be set up to mobile station 32 from gateway 12 through BTS 18 and BSC 16, either by means of 2G core network 20 and its interface A/Gb, or 3G core network 22 and its interface Iu. The user data path is set up based on registration information held in HLR 14. The registration information is updated at location updating or at routing area update, and contains additional information on mode of operation. The mobile station 32 will be paged either through the Iu interface or the A/Gb interface. Based on network configuration, the operator may decide that the mobile station 32 shall register in 3G network 22.

In one embodiment of the invention, the network broadcasts a value in the SI and/or PSI telling the mobile station 32 which core network it should camp on, depending on the mobile station history. For example, one bit in the SI/PSI could tell the mobile station 32 to select the 2G (or 3G) core network if the mobile station has no previous active registration in either core network when it is turned on. Another bit could tell the mobile station to stay in the core network it currently is in, or to move to the 3G CN in any event. This will give the operator control of the interface selection for all the mobile stations in the combined cell, and smart algorithms can be developed to reduce the bouncing and the signaling. In this embodiment the broadcasted value will be received by all mobile stations in the cell, but can be interpreted differently depending on which state a mobile station was in before the cell selection.

If a broadcasted selection value is not present in the SI and/or PSI, the mobile station will resort to a default solution that can be specified in a network standard. For example, the mobile station could be directed to always chose the 3G core network when no information is broadcast in the combined cell telling the mobile station to do otherwise.

In another embodiment, mode of operation for the mobile station 32 is network controlled by broadcasting cell specific information on channels BCCH, PACCH or PBCCH, the cell specific information indicating the rules for mode of operation to be applied for the combined cell 30. The mobile station may decode this information from a specific system information message or a parameter in the existing PSI/SI message. After the cell is selected and the mobile station has decoded the cell specific information, the mobile station makes a decision on mode of operation, i.e., Iu mode or A/Gb mode of operation. The network may, for example, unconditionally order all Iu capable mobile stations in the cell to select Iu mode of operation, or may unconditionally order all mobile stations in packet transfer mode to select A/Gb mode of operation. The network may also unconditionally order mobile stations to select Iu mode of operation on a subscription basis.

Two basic solutions are anticipated in connection with System Information messages that is, use of either an existing System Information message on BCCH, PBCCH and PACCH or else a new System Information message. Information related to selection of mode operation (interface) is distributed in the cell. Examples of different messages and information elements are set forth as follows:

BCCH
    Existing SI message—System Information type 2 bis. The rest octect contains the information distributed to mobile stations in the cell capable of Iu support
    <SI bis rest octets>::
        {LIH<GERAN cell Info(3=bits)>};
        <implicit spare>;

PBCCH
    Existing PSI message—Packet System Information type 1. The Information Element GPRS Cell Options contains the information related to Interface Capability. This information is optional distributed in cells capable of Iu and A/Gb.
    <GPRS Cell Option>::=<LIH<GERAN Cell Info(3b)>

PACCH
    Existing PSI messages—Packet System Information type 13 and Packet System Information Type 1. IE GPRS Cell Options containing information to control mode of operation for mobile in packet transfer mode.

Geran Cell Info
    This Information Element is sent on PACCH, PBCCH and BCCH to control the selection of mode of operation related to Interface selection. FIG. 2 shows this information element comprising a 3-bit code.

New System Information Messages
    Three new System Information messages are introduced to distribute the mode selection control information to mobiles entering a Iu capable cell.
    GERAN specific System Information Message—BCCH
    GERAN specific Packet System Information message—PBCCH
    GERAN Interface Control Message—PACCH
    In further embodiment of the invention, the mobile station 32 receives explicit signaling messages from the RAN or CN, either at attach or dynamically in connected mode, that tell the mobile station 32 which interface should be chosen when the mobile station performs cell selection. For example, already existing methods for network controlled cell change and network assisted cell change can be used to deliver information to the mobile station. The interface selection can then be made MS specific and does not affect the other mobile stations in the cell.

When a mobile station enters a location area (LA) or routing area (RA), it performs standard updating with respect to the network. In its answer back to the mobile station in connection with the updating procedure, the network may download interface control information to the mobile station, which will be valid for the whole LA or RA. Thus, the network provides information to the mobile station for selecting mode of operation in the form of an explicit signal.

The existing routing area accept and location update accept may be used to download specific GERAN interface control information. The same control mechanism used for the broadcast case may be applied on a user dedicated basis. The control information is valid per LA or routing area.

In a further embodiment of the invention, predefined rules for mode selection, such as a preference for one of the interfaces (Iu or A/Gb), are set in the mobile station SIM card. In this way, individual rules can be set for different subscribers. For example, a subscriber that will use IP multimedia services will always select the 3G core network although it might result in more signaling for the system. The SIM control mode of operation is typically enabled by an SIM enabling flag sent in broadcast information or in a mobility management (MM) specific procedure.

A further embodiment of the invention pertains to state controlled selection of mode of operation. For state controlled mode of operation, the mobile station uses its current mode of operation to decide mode of operation upon entering a new combination cell. Typically, in packet transfer mode the mobile station will not change its mode of operation. This may also be applicable for idle mode. For packet transfer mode, the state controlled mode of operation may be enhanced by allowing change of mode depending on Quality of Service.

The above principles for cell selection also apply for handover between Iu and A/Gb capable cells. The locating functioning in BSC 16 controls the mobile station mode of operation such that it makes it decision on preferred mode of operation in addition to radio performance characteristics.

Combinations of the above embodiments may be utilized to significantly enhance flexibility. The network operator may store specific information on the SIM, to provide different contexts of the broadcast information on how the mode of operation selection shall be carried out. One typical example is that SIM specific information encoded "6H" implies that broadcast information "10B" shall be understood by the mobile station to require selection only of Iu mode if the Iu mode was initially set up.

Change of mode of operation may typically occur at cell change, change of location area, change of routing area and at change of service area. A service area may consist of cells from more than one location area/routing area. The change of mode is accomplished based on network information, SIM specific information and current mode of operation. The mode change may be based on one of these criteria or combinations thereof Obviously, other modifications and variations of the present invention are possible in light of the above teachings. It is therefore to be understood that within the scope of the disclosed concept, the invention may be practiced otherwise than as specifically described.

What is claimed:

1. In a mixed telecommunication system comprising first and second core networks, a method for directing the mode of operation of a mobile station when the mobile station enters a combined region of the telecommunication system wherein said mobile station can operate through either said first or second core networks, said method comprising the steps of:
furnishing said mobile station with specified information when said mobile station enters said combined region from a region in which said mobile station can operate through only one of said first and second core networks, said specified information providing at least one indicator for selection of a first or second mode of operation of said mobile station; and,
selecting, by said mobile station, either said first or a second mode of operation for said mobile station in response to receipt of said specified information, said first and second modes of operation corresponding to said first and second core networks, respectively.

2. The method of claim 1 wherein:
said specified information is combined with information relating to the prior history of said mobile station in said step of selecting said mobile station mode of operation.

3. The method of claim 2 wherein:
said specified information comprises parameters introduced into broadcast system information for said combined region.

4. The method of claim 3 wherein:
said parameters provide a set of rules for selecting the mode of operation for said mobile station in said combined region.

5. The method of claim 2 wherein:
said specified information comprises parameters introduced into the SIM information of said mobile station.

6. The method of claim 2 wherein:
said specified information comprises an explicit signaling message directed to said mobile station when said mobile station enters said combined region.

7. The method of claim 2 wherein:
said specified information comprises parameters provided by any combination of information sources selected from a group of sources, said group including a broadcast of system information, the SIM of said mobile station, and an explicit signaling message directed to said mobile station.

8. The method of claim 2, wherein:
said history related information comprises information selected from a group including the current mobility management (MM) state, radio resource/radio resource control (RR/RRC) state and radio access technology (RATU) of said mobile station when said mobile station enters said combined region.

9. The method of claim 2, wherein:
said history related information comprises the number of cell changes in a specified unit of time which are made by said mobile station prior to entering said combined region.

10. The method of claim 1 wherein:
said specified information comprises parameters introduced into broadcast system information for said combined region.

11. The method of claim 1 wherein:
said specified information comprises parameters introduced into the SIM information of said mobile station.

12. The method of claim 1 wherein:
said specified information comprises an explicit signaling message directed to said mobile station when said mobile station enters said combined region.

13. The method of claim 1 wherein:
said specified information comprises the current mode of operation of said mobile station when said mobile station enters said combined region.

14. The method of claim 1 wherein:
said specified information comprises parameters provided by any combination of information sources selected from a group of sources, said group including a broadcast of system information, the SIM of said mobile station, and an explicit signaling message directed to said mobile station.

15. In a mixed telecommunication system comprising first and second core networks, wherein a mobile station is adapted for operation in first and second modes associated with said first and second core networks, respectively, a method for directing the mode of operation of a mobile station when the mobile station enters a combined region of the telecommunication system wherein said mobile station can operate through either said first or second core networks, said method comprising the steps of:
transmitting specified information to said mobile station when said mobile station enters said combined region from a region in which said mobile station can operate through only one of said first and second core networks, said specified information providing at least one indicator for selection of a first or second mode of operation of said mobile station; and
selecting, by said mobile station, either said first or a second a mode of operation for said mobile station in response to receipt of said transmitted information, said first and second modes of operation corresponding to said first and second core networks, respectively.

16. The method of claim 15 wherein:
said transmitted information comprises parameters introduced into broadcast system information for said combined region.

17. The method of claim 15 wherein:
said transmitted information comprises a SIM enabling flag sent in broadcast system information to provide a parameter from the mobile station SIM.

18. The method of claim 15 wherein:
said transmitted information comprises an explicit signaling message directed to said mobile station when said mobile station enters said combined region.

19. The method of claim 18 wherein:
said explicit signaling message is sent to said mobile station in connection with an updating procedure.

20. The method of claim 15 wherein:
said transmitted information is combined with information relating to the prior history of said mobile station in order to select said mobile station mode of operation.

21. The method of claim 15 wherein:
said mobile station is directed to select a specified one of said modes of operation.

22. The method of claim 15 wherein:
said mobile station is directed to select its current mode of operation.

* * * * *

UNITED STATES PATENT AND TRADEMARK OFFICE
CERTIFICATE OF CORRECTION

| | | |
|---|---|---|
| PATENT NO. | : 7,142,860 B2 | Page 1 of 1 |
| APPLICATION NO. | : 10/096692 | |
| DATED | : November 28, 2006 | |
| INVENTOR(S) | : Mildh et al. | |

It is certified that error appears in the above-identified patent and that said Letters Patent is hereby corrected as shown below:

In Column 4, Line 33, after "<SI bis rest octets>::" insert -- = --.

In Column 4, Line 34, delete "Info(3=bits)>}:" and insert -- Info(3 bits)>}; --, therefor.

In Column 4, Line 48, delete "Geran" and insert -- GERAN --, therefor.

In Column 4, Line 62, after "In" insert -- a --.

In Column 6, Line 54, in Claim 8, delete "RATU" and insert -- RAT --, therefor.

In Column 6, Line 61, in Claim 10, after "claim 1" insert -- , --.

Signed and Sealed this

Eighteenth Day of December, 2007

JON W. DUDAS
*Director of the United States Patent and Trademark Office*